United States Patent [19]

Ames

[11] Patent Number: 5,100,570

[45] Date of Patent: Mar. 31, 1992

[54] COOL STORAGE COMPOSITIONS

[76] Inventor: Douglas A. Ames, 15572 Computer La., Huntington Beach, Calif. 92649

[21] Appl. No.: 419,209

[22] Filed: Oct. 10, 1989

Related U.S. Application Data

[63] Continuation-in-part of Ser. No. 313,049, Feb. 21, 1989, Pat. No. 4,971,713, and a continuation-in-part of Ser. No. 338,534, Apr. 11, 1989, Pat. No. 5,037,571, which is a continuation of Ser. No. 126,505, Nov. 30, 1987, abandoned.

[51] Int. Cl.$^5$ .............................................. C09K 5/00
[52] U.S. Cl. ........................................ 252/70; 165/10
[58] Field of Search ............................ 252/70; 165/10

[56] References Cited

U.S. PATENT DOCUMENTS

| | | | |
|---|---|---|---|
| 4,244,148 | 1/1981 | Chabanon et al. | 252/70 |
| 4,349,446 | 9/1982 | Marks | 252/70 |
| 4,372,866 | 2/1983 | Ehlers et al. | 252/70 |
| 4,574,051 | 3/1986 | Matthews et al. | 252/70 |
| 4,637,888 | 1/1987 | Lane et al. | 252/70 |

FOREIGN PATENT DOCUMENTS

| | | | |
|---|---|---|---|
| 2631320 | 1/1978 | Fed. Rep. of Germany | 252/70 |
| 2539139 | 7/1984 | France . | |

OTHER PUBLICATIONS

Chem Abstracts, CA (96)(12):88544w, Preliminary Examination of Latent Heat-Thermal Energy Storage Materials, Ozawa et al. 1980.

*Primary Examiner*—Paul Lieberman
*Assistant Examiner*—Christine A. Skane
*Attorney, Agent, or Firm*—Watson, Cole, Grindle & Watson

[57] ABSTRACT

A cool storage composition that freezes at about 47° F. is composed of a 39 percent NaOH-in-water solution to which has been added an ionizable, water-soluble salt, such as KCl.

18 Claims, No Drawings 5,100,570

COOL STORAGE COMPOSITIONS

This application is a continuation-in-part of my prior application Ser. No. 313,049, filed Feb. 21, 1989, now U.S. Pat. No. 4,971,713. It is also a continuation-in-part of my application Ser. No. 338,534, filed Apr. 11, 1989, now U.S. Pat. No. 5,037,571, which is a continuation of application Ser. No. 126,505, filed Nov. 30, 1987 now abandoned.

FIELD OF THE INVENTION

The present invention refers generally to the field of thermal energy storage, sometimes referred to as TES, and more particularly to the storage of thermal energy by means of phase change materials, often refer to as PCM's. Such PCM's, and in particular PCM's used for cool storage, by their heat of fusion store cooling capacity as they change their state from liquid to solid. After being frozen, subsequent melting of the frozen solid results in heat being taken from ambient fluids as the solid acquires heat energy in order to resume its liquid state.

BACKGROUND OF THE INVENTION

Thermal energy storage compositions used for cool storage have achieved definite success in the marketplace at the present time. Those compositions are presently being used to store coolness during off-peak periods when, because of a differential in consumption rates and/or demand charges, the cost of electrical energy is less, and then release such stored coolness during peak periods when electric utilities must meet greater demands for their services During peak usage periods utilities normally will impose a demand charge based on the maximum number of kilowatts demanded for use during the period, as well as increased rates for electricity, usually measured as kilowatt hours, consumed during the period. It thus has become commercially expedient for a wide variety of users of electricity during peak periods, e.g., industrial plants, hospitals, schools, houses of worship, and the like, to utilize cool storage compositions whereby chillers to chill water to be circulated throughout the buildings are utilized primarily during off-peaks hours.

In a typical cool storage use, a relatively large tank, which may be located below grade, is filled with bottles of a cool storage composition based on sodium sulfate decahydrate. Such bottles are preferably of the utilitarian shape disclosed and claimed in my U.S. patent application Ser. No. 696,529, filed Jan. 30, 1985, and entitled, Nestable, Stackable Containers. During the least expensive off-peak time of use, e.g., midnight to 6 a.m., a chilled fluid such as water is circulated within the tank containing the bottles of salts. That water, which has been chilled to a temperature below about 47° F., is circulated about the stacked, spaced bottles in the tank until the contents of the bottles, which freeze at about 47° F., have been frozen. The repetitive cycle comprises chilling the water, passing it through the tank in contact with the bottles, and then recycling the water to the chiller and the tank again.

After the salts in their bottles have all been frozen, the chillers are deactivated. Then, during peak periods, e.g., noon to 6 p.m. the following day, rather than activate the chiller that consumes large quantities of electricity and results in a high demand charge during the peak period, a pump in the system is used to force line water, normally at a temperature above 47° F., through the tank where that water is chilled to about 47° F. as the frozen salts in their containers begin to melt, thus, acquiring heat from the surrounding water. That chilled water is then pumped through the building to enable the building to be air-conditioned, and then down into the tank, where the water is again chilled to approximately 47° F. In this manner cool storage compositions have been in commercial use to transfer usage of electricity from peak to off-peak periods.

The above described system is what is known as a full storage system; in certain circumstances, according to utility rates, it may be more economic to utilize a partial storage system in which only a part of the cooling needs of the building during peak periods are met by the stored coolness, the other portion being supplied by chilled water directly from the chiller.

As pointed out in my above-mentioned application Ser. No. 126,505, filed Nov. 30, 1987, PCM's presently used commercially as cool storage compositions of matter are those based on Glauber's salt, sodium sulfate decahydrate. The Glauber's salt is a basic part of a fairly sophisticated composition, that cost of which is a definite factor in the achievement of economic viability of cool storage compositions. A typical consumer for such a cool storage composition system will measure the cost effectiveness of the system on the payback period, measured as the amount he has to pay for the cool storage system divided by the annual savings from paying a lower demand charge and the differential between peak and off-peak energy consumption rates.

Although the use of off-peak cool storage systems results in great savings to the environment because less burning of fossil fuels is required, since most electric utilities do not utilize their full, off-peak, base load requirement that must be maintained in any case, the customer is primarily concerned with the number of years that it will take until his out-of-pocket savings balances his expenditure for the system. Generally, a three-year payback period is considered the dividing line so far as attractiveness of the system to the customer is concerned.

As a consequence, it is exceptionally important for commercial viability of a cool storage composition of matter that the composition not only be relatively cheap to manufacture and composed of ingredients that are in plentiful supply and reasonably priced, but of a cool storage composition that will store relatively large quantities of coolness with a given weight of composition. Because, as previously referenced, the cool storage compositions presently based on Glauber's salt are contained within bottles, which are stacked in tanks usually formed from concrete, the greater the cool storage capacity of the composition per unit of weight, the fewer bottles thereof need be utilized in order to store a specific number of BTU's on freezing. Fewer bottles result in a reduction in the plastic from which the bottles are made, and the fewer the number of bottles, the smaller the tank that need be utilized to hold the bottles. Thus, even with comparable costs of materials between Glauber's salt-based storage compositions and other cool storage compositions, great savings can be effected by use of a composition which has a significantly greater heat of fusion, that is, the ability to store more BTU's per pound of material utilized.

While in prior patent applications of which the subject application is a continuation-in-part I have disclosed the use of a sodium hydroxide-water solution which has a freezing/melting point plateau of approximately 41° F., and while the attainment of cool storage compositions having that lower freezing point is believed to be a significant achievement in this art, nevertheless, particularly in retrofit applications where the existing chiller cannot chill water to temperatures below 38° F. for extended periods of time without undue wear, 47° F. water is still a reasonable, low temperature for chilled water. Although the sodium hydroxide/water cool storage compositions of my prior applications are particularly useful when a chiller can easily provide water temperatures as low as 34° F. to 36° F., where a chiller already in place can only consistently produce water at, say 42° F. to 44° F., a 41° F. melting/freezing point plateau composition of matter will be inutile.

Thus, while my prior $NaOH/H_2O$ compositions that have a freezing/melting point plateau of about 41° F. have been a bellwether for low-temperature coolness storage compositions, those compositions do not have universal applicability. In many applications the demands of the marketplace require a cool storage composition having a melting/freezing point plateau of about 47° F., and sodium sulfate-based compositions are the only ones presently available. However, a 47° F. cool storage composition having improved cool storage capacity, i.e., a higher heat of fusion than Glauber's salt-based compositions, should have a definite place in the market, particularly when that composition has an increased heat of fusion as compared with that of the present, Glauber's salt-based, cool storage compositions.

It is, therefore, a primary object of the present invention to provide a phase change material that will freeze and melt at a plateau at about 47° F., but which will have a higher heat of fusion than conventional, Glauber's salt-based compositions.

It is a further object of my invention to provide a cool storage composition of matter which has an improved heat of fusion on the order of the improvement achieved by my 41° F. melting/freezing point NaOH/water-based compositions, but which will have a melting/freezing point plateau at approximately 47° F. rather than at about 41° F. The present invention is believed to achieve the above objects.

SUMMARY OF THE INVENTION

The present invention is, as somewhat broadly defined, a coolness storage composition of matter based on a sodium hydroxide-water solution in which the sodium hydroxide is present at about a 39 percent concentration. In order to establish a freezing/melting point plateau of about 47° F., an ionizable, water-soluble salt or salts are added to the solution in amounts sufficient to lower the freezing/melting point plateau to that temperature. Salts which as have been found particularly effective are alkali metal halides, particularly potassium chloride and sodium chloride. Where both potassium and sodium chloride are used, the ratio of KCl to NaCl is between about five to three, to eight to three, more preferably about two to one.

In order to prevent supercooling, a nucleating agent may be added to the composition. Such nucleating agents are usually chromates or dichromates. When a nucleating agent is added, it is further feature of the invention that a dispersant may be used to maintain the nucleating agent in suspension in the NaOH/water/salt solution. A dispersant that has been found to be especially effective is xanthan gum. The dispersant may also be a thickener, such as a finally divided clay, e.g., attapulgite clay.

DETAILED DESCRIPTION OF THE INVENTION

As has been stated, the basis of the present invention is the use of a sodium hydroxide-in-water solution having a specific concentration: approximately 39 percent by weight sodium hydroxide. That concentration can vary somewhat; however, variance of the concentration by plus or minus two percent is the most that is normally advisable. The use of a 39 percent NaOH-in-water composition is not suitable as a coolness storage composition, because its melting/freezing point is too high. As a consequence, an ionizable, water-soluble salt or salts must be used to lower the temperature of the 39 percent NaOH/water solution as much as possible. While many different salts can be used to accomplish this function, no matter what salts or combinations thereof were used, it has not been possible to obtain a 39 percent NaOH-in-water solution that has a melting/freezing point plateau substantially less than 47° F. As a possible basis for the phenomenon that all of the compositions of the present invention melt and freeze at a plateau varying about 1° or 2° F., usually at about 47° F. to 49° F., it is theorized that a tertiary or quaternary eutectic or congruent melting point composition has been formed. Whatever the theoretical basis, it is a fact that when most salts were used in effective quantities, the lowest freezing/melting point plateau that could be achieved was approximately 47° F.

Many experiments have been carried out under my direction utilizing a variety of readily available, inorganic water-soluble salts. Where a single salt was used, potassium chloride was found to be the most effective. Compositions in which potassium chloride alone was successfully used are as follows, with the quantities indicating, respectively, NaOH, KCl and $H_2O$. Thus, one of the compositions successfully tested, i.e., which froze solid, was 36/6/58, which indicates 36 weight units of NaOH, 6 weight units of KCl and 58 weight units of $H_2O$. Other compositions of similar formulations which froze solid were 35/11/54, 38/7/55, 36/6/58, 38/7/55 and 35/9/56.

Sodium chloride has also been used alone successfully. One of these compositions was 35 units NaOH, 5 units NaCl, and 60 units $H_2O$. Quite successful were compositions where both KCl and NaCl were utilized. Some of those compositions where the units by weight refer, in order, to NaOH, KCl, NaCl and $H_2O$, are 35/8/3/54 and 37/6/3/54. Due to their ready availability and reasonable price, potassium and sodium chloride are preferred.

Aluminum chloride has also tested satisfactorily. Compositions which froze solid and employed aluminum chloride as the only salt, did so at quantities of 38 weight units NaOH, 3 weight units $AlCl_3$ and 59 weight units water. Also freezing solid were compositions 37/4/59 and 38/2/60. Magnesium chloride froze solid in a composition of 35/10/55, where the $MgCl_2$ was the central figure by weight.

Other compositions that froze solid included, as ionizable salts, a combination of $Na_2SO_4$, $AlCl_3$ and KCl in ratios, for example, of 32 NaOH/11 KCl/4 $Na_2SO_4$/4$AlCl_3$/49 $H_2O$, 34/11/4/3/48 and 32/11/4/2/51. $Na_2SO_4$ and KCl, without the $AlCl_3$, froze solid in the following weight proportions: 33 NaOH/11 KCl/5 Na$_2$SO$_4$/59 H$_2$O, 34/11/2/53, 31/8/12/49, and others.

Sodium acid phosphate and KCl in combination performed to give the desired result: a composition having a freezing/melting point plateau at about 47° F. Such compositions included the following by unit weights: 34 NaOH/10 Na$_2$HPO$_4$/10KCl/46 H$_2$O, 31/10/10/49, 34/2/10/54, 34/10/2/54 and 31/5/15/49.

Also showing positive test results were Al$_2$O$_3$, K$_2$HPO$_4$ plus KCl plus Na$_2$SO$_4$, Na$_2$SO$_4$ plus NaCl plus Mg(CO$_3$)$_2$, K$_2$HPO$_4$ plus Na$_2$HPO$_4$, NaBr, Al$_2$O$_3$, and Na$_2$CO$_3$ plus Na$_2$HPO$_4$ plus KCl. At times some compositions were not completely frozen, i.e., not frozen solid. It is not completely clear whether such failure to freeze solid was due to the particular composition or whether extraneous factors, for example, that the water used to chill the compositions was at an insufficiently low temperature or circulated for an insufficient period of time, were the cause.

At present the most preferred composition, that is, the best mode of the present invention, is a composition of matter having the formula: 37 parts NaOH, 6 parts KCl, 3 parts NaCl, 54 parts H$_2$O and 4 parts Na$_2$CrO$_4$. Also preferred are similar compositions using about 6 parts KCl as the sole ionizable salt, and those using 10 parts each of Na$_2$HPO$_4$ and KCl with 31 parts NaOH and 51 parts water. A chromate is generally preferred to be utilized as the nucleating agent in an amount of 4 to 6 parts by weight. The chromate is generally supplied in the most economic form available, i.e., sodium or potassium chromate or dichromate.

Where a nucleating agent such as a chromate is utilized, it has also been found advisable in some instances, although it is not presently my best mode, to use a dispersant to keep the chromate from settling out of the solution. Although if a sufficient quantity of chromate is used, such settling out does not appear to be a problem of a special significance, when a dispersant is used, it has been found that xanthan gum in an amount of about 1 to 3, usually 2 parts by weight, will be preferred. If a dispersant is used, it may also be desirable to use one that acts as a thickener. Such dispersants are well known, although not for this particular use which is in a highly basic medium. Dispersant-thickeners that have been effective are finally divided clays, such as attapulgite clay, in minor amounts, e.g., 1 to 2 parts by weight or percent.

In use, the compositions of my invention may be brought into contact with a fluid that acts to freeze, or is chilled by the frozen compositions, in several ways. Exemplarily, the composition may be packaged in nestable, stackable containers, e.g., those disclosed in my copending application Ser. No. 696,529, filed Jan. 30, 1985, now U.S. Pat. No. 4,872,557. As so packaged, the containers are spaced vertically from each other so that a fluid such as water can be passed between them in heat exchange relationship. In addition, my composition in bulk can be enclosed in a tank and water or other fluid passed through the tank in a network of tubes. In this manner the composition can be frozen by water that has been chilled e.g., to 41° F. Conversely, in the discharge phase, line water in the network of tubes is chilled to about 47° F. to 49° F. as the bulk composition melts.

It will be apparent to those of skill in this art that while the present invention has been described with reference to a best mode and preferred embodiments of the invention, certain modifications and alterations in those embodiments will be obvious. As to all such modifications and alterations, it is desired that they be included within the purview of the present invention, which is to be limited only by the scope, including equivalents, of the following, appended claims.

I claim:

1. A cool storage composition of matter having a defined freezing/melting point plateau, comprising a sodium hydroxide-in-water solution having a sodium hydroxide concentration of approximately 39 percent and having a freezing/melting point plateau substantially higher than 47° F., and, as a freezing/melting point temperature modifier, inorganic ionizable, water-soluble salt or salts in an amount sufficient to lower said freezing/melting point plateau of said composition to about 47° F., so that said composition will change from liquid to solid state on being subjected to temperatures below about 47° F. and thereafter release the coolness stored by its heat of fusion on thermal contact with a fluid medium above about 47° F.

2. A cool storage composition as claimed in claim 1, in which said salt is an alkali metal halide.

3. A cool storage composition as claimed in claim 2, in which said salt is potassium chloride.

4. A cool storage composition as claimed in claim 2, in which said salt is sodium chloride.

5. A cool storage composition as claimed in claim 1, in which salts are potassium chloride and sodium chloride.

6. A cool storage composition as claimed in claim 5, in which the ratio of potassium chloride to sodium chloride is about 5 to 3 to 8 to 3.

7. A cool storage composition as claimed in claim 6, in which said ratio is approximately 2 to 1.

8. A cool storage composition as claimed in claim 1, in which said composition is maintained in bulk in a tank, and a fluid circulated in tubes through said tank acts to freeze or be chilled by said composition.

9. A cool storage composition of matter having a defined freezing/melting point plateau, comprising a sodium hydroxide-in-water solution having a sodium hydroxide concentration of approximately 39 percent and having a freezing/melting point plateau substantially higher than 47° F., and, as a freezing/melting point temperature modifier, an inorganic ionizable, water-soluble salt or salts in an amount sufficient to lower said freezing/melting point plateau of said composition to about 47° f., so that said composition will change from liquid to solid state on being subjected to temperatures below about 47° F. and thereafter release the coolness stored by its heat of fusion on thermal contact with a fluid medium above about 47° F., and a nucleating agent in an amount sufficient to inhibit supercooling of said composition to a temperature substantially below about 47° F.

10. A cool storage composition as claimed in claim 9, in which said nucleating agent is a chromate or dichromate.

11. A cool storage composition as claimed in claim 9, in which said composition is maintained in bulk in a tank, and a fluid circulated in tubes through said tank acts to freeze or be chilled by said composition.

12. A cool storage composition of matter having a defined freezing/melting point plateau, comprising a sodium hydroxide-in-water solution having a sodium hydroxide concentration of approximately 39 percent and having a freezing/melting point plateau substantially higher than 47° F., and, as a freezing/melting point temperature modifier, an inorganic ionizable, water-soluble salt or salts in an amount sufficient to lower said freezing/melting point plateau of said composition to about 47° F., so that said composition will change from liquid to solid state on being subjected to temperatures below about 47° F. and thereafter release the coolness stored by its heat of fusion on thermal contact with a fluid medium above about 47° F., a nucleating agent in an amount sufficient to inhibit supercooling of said composition to a temperature substantially below about 47° F., and a dispersant in an amount effective to maintain said nucleating agent in suspension in said NaOH/water/salt solution.

13. A cool storage composition as claimed in claim 12, in which said dispersant is xanthan gum.

14. A cool storage composition as claimed in claim 12, in which said nucleating agent is a chromate or dichromate.

15. A cool storage composition as claimed in claim 13, in which said dispersant is also a thickener.

16. A cool storage composition as claimed in claim 15, in which said dispersant is a finely divided clay.

17. A cool storage composition as claimed in claim 16, in which said dispersant is attapulgite clay.

18. A cool storage composition as claimed in claim 12, in which said composition is maintained in bulk in a tank, and a fluid circulated in tubes through said tank acts to freeze or be chilled by said composition.

* * * * *